United States Patent
Feher et al.

(10) Patent No.: US 9,476,404 B2
(45) Date of Patent: Oct. 25, 2016

(54) METHOD FOR ASSEMBLING A SEGMENTED ELECTRICAL MACHINE WHILE MAINTAINING GAPS BETWEEN SEGMENTS

(75) Inventors: Kornel Feher, Ruhstorf (DE); Ulrich Hartmann, Berlin (DE); Martin Junge, Grafenau (DE); Andreas Jöckel, Nürnberg (DE); Martin Kristl, Untergriesbach (DE); Wilfried Luchs, Berlin (DE); Oliver Memminger, Neuburg (DE); Joachim Mucha, Berlin (DE); Axel Möhle, Berlin (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 341 days.

(21) Appl. No.: 14/009,696

(22) PCT Filed: Mar. 13, 2012

(86) PCT No.: PCT/EP2012/054374
§ 371 (c)(1),
(2), (4) Date: Oct. 3, 2013

(87) PCT Pub. No.: WO2012/136449
PCT Pub. Date: Oct. 11, 2012

(65) Prior Publication Data
US 2014/0028138 A1  Jan. 30, 2014

(30) Foreign Application Priority Data
Apr. 4, 2011  (EP) .................... 11160956

(51) Int. Cl.
*H02K 15/02* (2006.01)
*H02K 7/18* (2006.01)
(Continued)

(52) U.S. Cl.
CPC ............. *F03D 1/001* (2013.01); *F03D 1/00* (2013.01); *F03D 9/11* (2016.05); *H02K 1/06* (2013.01);
(Continued)

(58) Field of Classification Search
CPC .. H02K 7/1823; H02K 7/183; H02K 7/1838; H02K 15/02; H02K 15/028; H02K 15/03; H02K 15/024; H02K 15/026; F03D 1/00; F03D 1/001; F03D 9/002
USPC ............ 310/267, 216.008, 216.009; 29/596, 29/598
See application file for complete search history.

(56) References Cited

U.S. PATENT DOCUMENTS 5,844,341 A * 12/1998 Spooner ............... H02K 7/1838
                                                        310/216.021
2002/0101081 A1  8/2002 Joeckel
(Continued)

FOREIGN PATENT DOCUMENTS

DE  10 2009 005 956 A1  7/2010
DE  WO 2011006810 A2 *  1/2011  ............. H02K 1/276
(Continued)

OTHER PUBLICATIONS

Machine translation of WO 2011006810 A2 (Jan. 2011).*

*Primary Examiner* — Michael Andrews
(74) *Attorney, Agent, or Firm* — Henry M. Feiereisen LLC

(57) ABSTRACT

In a method an inner segment is first pre-assembled on each of a number of outer segments by at least one fixing element, so as to produce a plurality of segment modules having each a predetermined air gap between the inner segment and the outer segment. The inner segments and the outer segments are assigned to the rotor or stator of the electrical machine. The inner segments of the plurality of segment modules are fastened to an inner assembly device (for example a hub). The outer segments of the plurality of segment modules are fastened to an outer assembly device (for example a supporting structure). Finally, the fixing elements between the inner segments and the outer segments are removed.

11 Claims, 2 Drawing Sheets

(51) Int. Cl.
*F03D 1/00* (2006.01)
*H02K 1/06* (2006.01)
*H02K 15/03* (2006.01)
*H02K 15/16* (2006.01)

(52) U.S. Cl.
CPC ............... *H02K 15/02* (2013.01); *H02K 7/183* (2013.01); *H02K 7/1838* (2013.01); *H02K 15/03* (2013.01); *H02K 15/16* (2013.01); *H02K 2201/03* (2013.01); *H02K 2213/12* (2013.01); *Y02E 10/728* (2013.01); *Y10T 29/49009* (2015.01)

(56) References Cited

U.S. PATENT DOCUMENTS

| | | |
|---|---|---|
| 2004/0011578 A1 | 1/2004 | Hoffmann et al. |
| 2004/0222761 A1 | 11/2004 | Joeckel |
| 2007/0046132 A1* | 3/2007 | Yamamoto ............. H02K 1/148 310/216.012 |
| 2008/0036328 A1 | 2/2008 | Hoffmann et al. |
| 2008/0272669 A1 | 11/2008 | Bade et al. |
| 2008/0309174 A1 | 12/2008 | Joeckel |
| 2009/0091210 A1 | 4/2009 | Bade et al. |
| 2009/0234548 A1 | 9/2009 | Bergner et al. |
| 2009/0289517 A1 | 11/2009 | Joeckel et al. |
| 2010/0239441 A1 | 9/2010 | Bade et al. |
| 2011/0067596 A1 | 3/2011 | Joeckel |
| 2011/0163550 A1 | 7/2011 | Moehle et al. |
| 2011/0254391 A1 | 10/2011 | Elender et al. |
| 2011/0254395 A1 | 10/2011 | Friedl et al. |
| 2011/0278969 A1 | 11/2011 | Memminger et al. |
| 2011/0291423 A1 | 12/2011 | Germishuizen et al. |
| 2012/0056571 A1 | 3/2012 | Buse et al. |
| 2012/0098271 A1 | 4/2012 | Bayer et al. |
| 2012/0112466 A1* | 5/2012 | Junge .................... H02K 1/276 29/596 |
| 2012/0187793 A1 | 7/2012 | Hartmann et al. |
| 2012/0205998 A1 | 8/2012 | Seibicke et al. |

FOREIGN PATENT DOCUMENTS

| | | |
|---|---|---|
| WO | WO 00/60719 A1 | 10/2000 |
| WO | WO 2008/116464 A2 | 10/2008 |

* cited by examiner

METHOD FOR ASSEMBLING A SEGMENTED ELECTRICAL MACHINE WHILE MAINTAINING GAPS BETWEEN SEGMENTS

CROSS-REFERENCES TO RELATED APPLICATIONS

This application is the U.S. National Stage of International Application No. PCT/EP2012/054374, filed Mar. 13, 2012, which designated the United States and has been published as International Publication No. WO 2012/136449 and which claims the priority of European Patent Application, Serial No. 11160956.6, filed Apr. 4, 2011, pursuant to 35 U.S.C. 119(a)-(d).

BACKGROUND OF THE INVENTION

The present invention relates to a method for installing an electric machine, in particular a generator for a wind turbine generator system. The present invention also relates to such an electric machine with a stator and a rotor.

Wind turbine generator systems are generally equipped with relatively large generators. These generators are often not installed until they are on site. This applies in particular to two components of the generator, namely the rotor and the stator. This is irrespective of whether an external stator and internal rotor are used, or an external rotor and internal stator.

Since the rotor is normally equipped with permanent magnets it constantly exerts a magnetic force on the stator components. The consequence is that the components of the stator are difficult to position and install opposite the components of the rotor. These problems are particularly severe for direct-drive wind turbines that have a very large diameter.

Up to now, there have been installation methods in which the rotor is preinstalled as a complete unit and, in the case of an internal rotor, is then surrounded on site with stator segments which together constitute a complete stator ring. Such segmented machines have a joint between the segments. Before the segments are bolted the joints have to be padded out with plates of appropriate thickness to produce a continuous ring. This padding of the joints calls for great skill and experience. It often presents problems on site in the open air.

SUMMARY OF THE INVENTION

The object of the present invention is to propose a method for assembling an electric machine which is easy to implement and enables the various components to be easily transported to the assembly site. In addition, a suitable electric machine is proposed.

According to the invention, this object is achieved by a method for assembling an electric machine, in particular a generator for a wind turbine generator system, by
assembling one inner segment on multiple outer segments with the aid of at least one fixing element in each case so that multiple segment modules are produced, in which there is a predefined air gap between the inner segment and the outer segment, and in which the inner segments and outer segments are ring segments and are assigned to the rotor or stator of the generator,
fastening the inner segments of the multiple segment modules to an inner assembly device so that the segment modules form a complete ring,
fastening the outer segments of the multiple segment modules to an outer assembly device, and
removing the fixing elements between the inner segments and the outer segments.

In addition, according to the invention an electric machine is provided in particular for a wind turbine generator system with
a stator and
a rotor, in which
the rotor and stator of the electric machine each have inner segments that can be separated from each other or outer segments that can be separated from each other,
the inner segments and outer segments are ring segments,
each inner segment is assigned to one of the multiple outer segments,
between the inner segments and the outer segments there is a predefined air gap,
the inner segments are fastened to an inner assembly device to form a ring, and the outer segments are fastened to an outer assembly device to form a ring.

The method according to the invention beneficially fixes inner and outer segments to one another in pairs in a pre-assembly stage, in which the two are separated from one another by a predefined air gap. This produces a ring-segment-shaped segment module which has a rotor segment and a stator segment. Such segment modules are easier to handle than a completely preassembled rotor, for example. In addition, the segments have a fixed spacing from one another so there is automatically the correct air gap between the rotor and the stator when the segment modules are then assembled to form a complete ring. By contrast, constant checks are needed in the conventional assembly method to ensure that the desired air gap is maintained.

The inner segments and/or the outer segments are preferably fixed to one another in the circumferential direction. This direct assembly in the circumferential direction means that they are coupled to one another not only indirectly via the inner and outer assembly devices. This improves the strength of the rotor and stator.

In addition, the inner segments and/or outer segments may have a flange for fixing to the inner assembly device (e.g. hub) or outer assembly device. For example, such a flange enables the inner segments to be fixed to the hub of the electric machine. In this case, the flange protrudes radially inwards from the inner segments. In the case of the outer segments the flange can protrude radially outwards so that they can be fastened to an appropriate outer ring.

According to a development, there is provision that each of the inner segments and outer segments extends in the circumferential direction across a first angle range, each of the inner segments and outer segments has a flange, and each flange extends across a smaller angle range than the first angle range. This ensures that the flange segments do not strike one another during assembly and do not therefore lead to undesired large joints between the segment modules.

In addition, the segment modules can be fastened to the inner assembly device and the outer assembly device so that a gap remains between neighboring segment modules in the circumferential direction. This intentional gap serves to offset any tolerances. As a result, less precise tolerances can be maintained in manufacturing the segment modules, i.e. the stator segments and rotor segments. There are cost benefits in manufacture here.

A connecting element can be inserted in each gap between the segment modules to connect the adjacent segments to one another. Each connecting element may comprise several components, e.g. plates. This enables gaps of different widths due to manufacturing tolerances to be filled precisely.

A sealing element may also be inserted in each gap from the outside. Such sealing elements ensure that for example no moisture or dirt can enter the air gap of the electric machine through the tolerance gap.

BRIEF DESCRIPTION OF THE DRAWING

The present invention is explained below with reference to the appended drawings where:

FIG. 3 shows an enlarged section of a joint between two segment modules.

DETAILED DESCRIPTION OF PREFERRED EMBODIMENTS

The exemplary embodiments described below are preferred embodiments of the present invention.

A direct-drive wind generator, for example, is to be manufactured with a large inner rotor and a correspondingly large outer stator. The manufacturing process can be used however for any other electric machine, irrespective of whether it has an inner rotor or outer rotor.

The core concept of the present invention is that both the stator and the rotor are segmented and the segments are preassembled in pairs to form a module. The purpose of this segmentation and preassembly is to simplify transport and final assembly at the intended location, which is beneficial in particular for offshore wind turbine generator systems.

Figure 1:
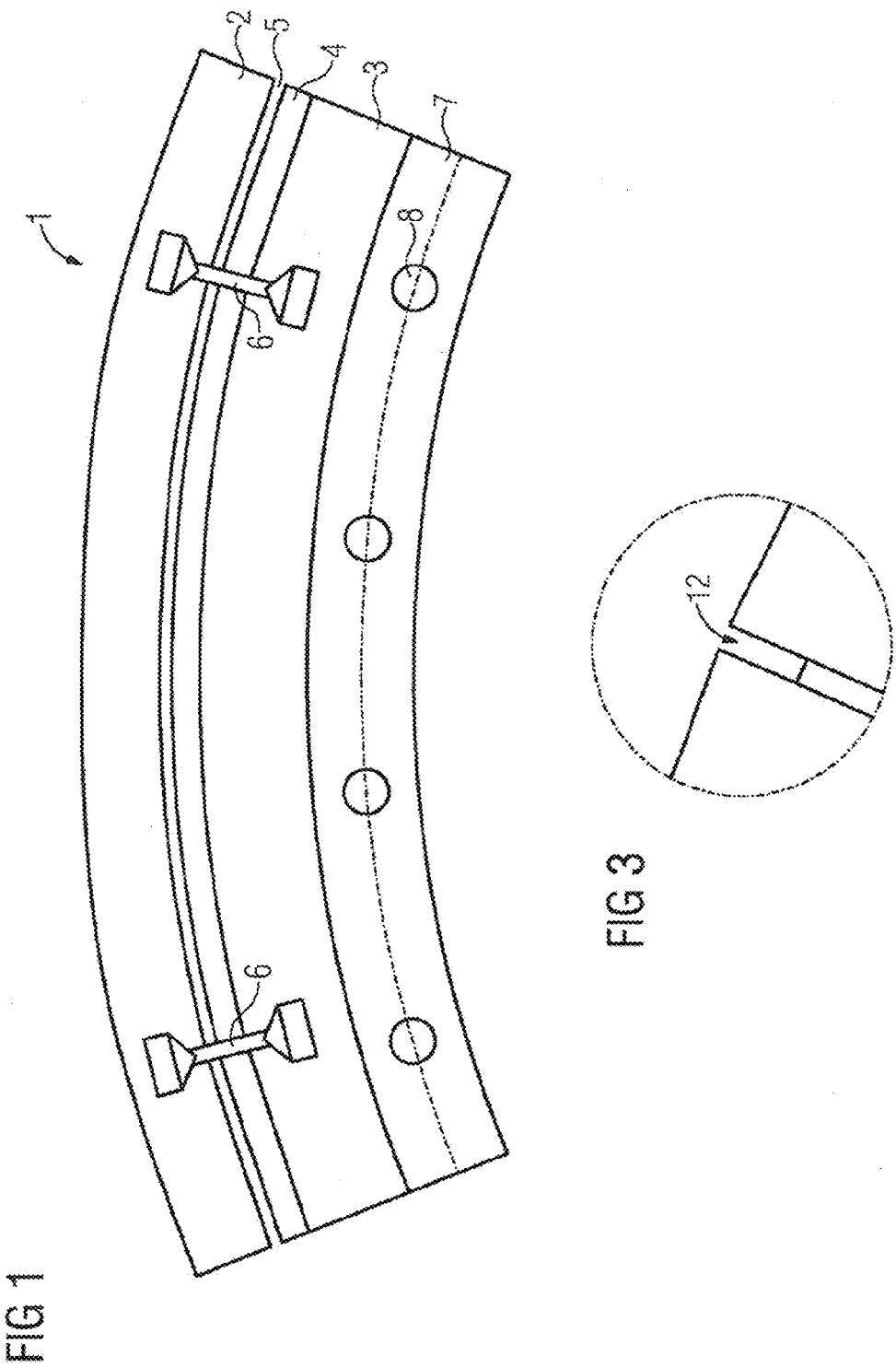
FIG. 1 shows a side view of a segment module according to the invention.

FIG. 1 shows a side view of a segment module 1 according to the invention. Eight such segment modules form a complete ring. Consequently each segment module extends across an angle range of 45°. Obviously the segment modules can be larger or smaller in terms of the angle dimensions. In particular, a segment module may extend over 90° or 180°.

The segment module 1 here has an outer segment 2 and an inner segment 3. Since the electric machine in this example has an inner rotor, the outer segment 2 here is a stator segment and the inner segment 3 is a rotor segment. The rotor or inner segment 3 in FIG. 1 has permanent magnets 4, shown symbolically. An annular air gap 5 lies concentrically between the ring-segment-shaped outer segment 2 and the ring-segment-shaped inner segment 3.

The outer segment 2 and the inner segment 3 are fixed to one another by fixing elements 6 in order to ensure an air gap 5. In the present case, two fixing elements 6 can be seen. In order to achieve a stable segment module there are two such fixing elements, for example, on both faces of the segment module. More than two fixing elements per face may be provided. It is also possible for the fixing elements 6 to extend axially through the segment module 1 so that in this case only two such fixing elements 6 are necessary.

The fixing elements 6 can be moved in the axial direction from the segment module 1. They not only provide retention during transport but also ensure a defined air gap width.

A flange segment 7 is attached to the inside of the inner segment 3. The flange segment protrudes radially inwards and extends essentially across the same angle range as the outer segment 2 and the inner segment 3. It also has axial holes 8 for fastening purposes.

Figure 2:
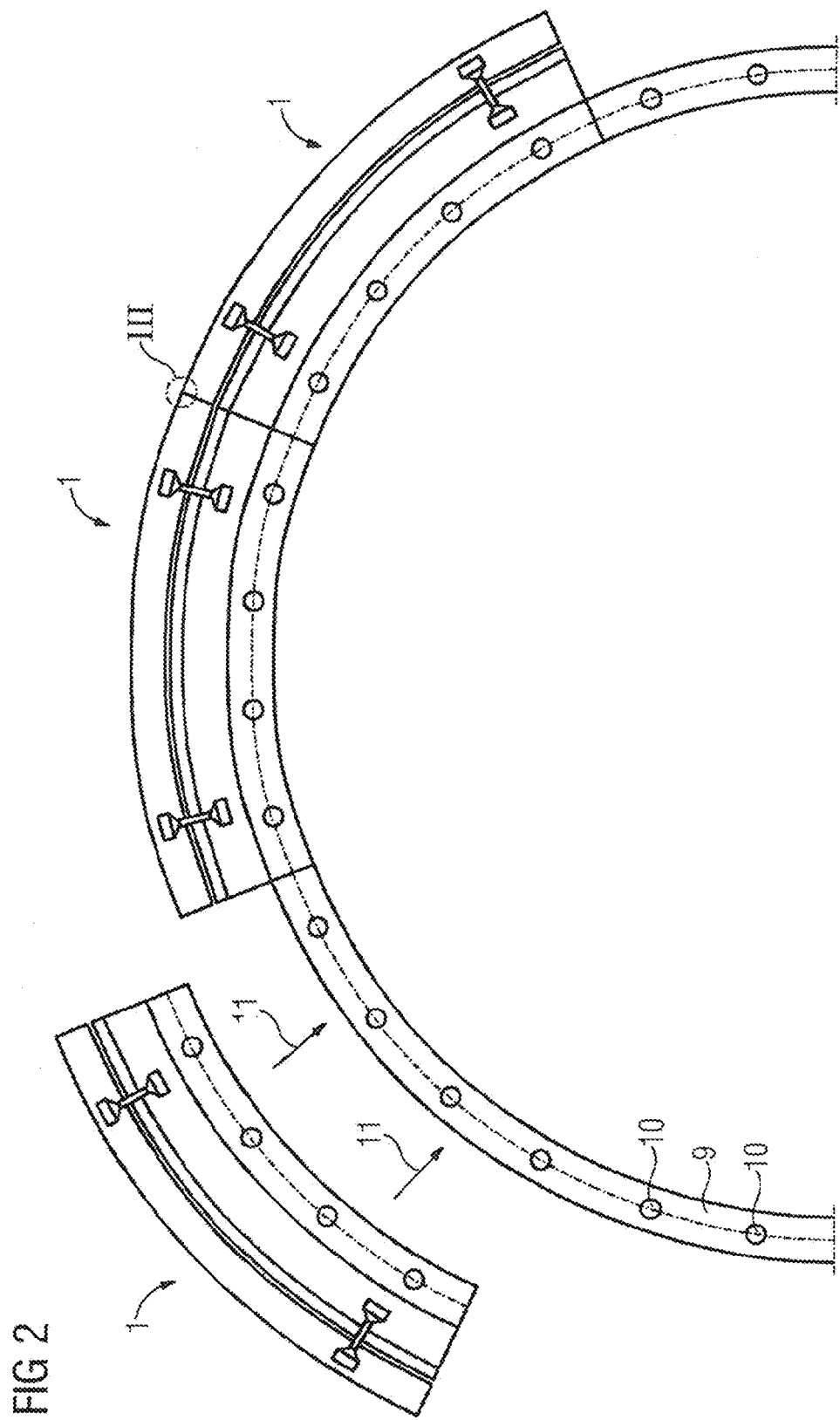
FIG. 2 shows a section through a hub on which multiple segment modules are assembled.

Such segment modules 1 are now fastened to a hub 9 for example according to FIG. 2. In the view here only half of the hub 9 is shown so only a half-ring can be seen. The hub 9 may for example be a hollow shaft. On its face here it has holes 10 evenly distributed in the circumferential direction. They are used for bolting on the flanges 7 of the inner segments 3 of the segment modules 1. During assembly, the individual segment modules 1 are mounted radially on the hub 9 according to the arrows 11 so that ultimately a complete electric machine with a rotor and a stator is produced.

The entire assembly procedure for the electric machine consists of the following four basic steps:
a) The segment modules 1 including the outer segment 2 and inner segment 3 and fixing elements 6 and possibly including the flange 7 are preassembled and transported to the final destination.
b) The segment modules 1 are mounted on an inner assembly device, e.g. hub.
c) The segment modules 1 are fastened to an outer assembly device, e.g. a stator support unit.
d) The fixing elements 6 are removed so that the rotor (hub 9 and inner segments 3) can rotate with respect to the stator (outer segments 2).

The preassembly and provision of segment modules 1 has the advantage that the air gap 5 can be set at the factory. It is maintained during assembly by the fixing elements 6 and is retained at the end of assembly after removal of the fixing elements 6. The fixing elements 6 absorb in particular the forces that the permanent magnets 4 of the rotor segment 3 exert on the stator segment 2.

Both the stator segment 6 and the rotor segment 3 extend across the same angle range here, e.g. 45°. The flange 7 attached radially inwards on the inner rotor or inner segment 3 is also arc-shaped and, in a special embodiment, does not extend across the entire angle range covered by the inner segment 3, which means that excessively large gaps between the individual segment modules 1 cannot arise in the assembled state as a result of different tolerances.

During assembly the paired segments, i.e. the segment modules 1, as mentioned, are first positioned on the hub and fixed. In the case of an inner rotor the hub 9 rotates; in the case of an outer rotor this hub 9 is part of the supporting structure. In each case the inner segments 3 are centrically aligned. Since the outer segments 2 (stator in the case of an inner rotor, or rotor in the case of an outer stator) are fixed via the air gap 5 precisely on the inner segments 3 (fixing elements 6), these are also aligned and an air gap 5 of constant size is ensured. Manufacturing tolerances are compensated by the joints 12 between the segment modules 1. FIG. 3 is an enlarged view of such a joint 12.

An outer flange, not shown in FIG. 2, on each segment module 1 does not have a centering property so there is no redundancy. Instead, the outer segments 2 are connected with the central flange in a force fit (stationary component of the turbine in the case of an inner rotor; rotating component in the case of an outer rotor). All the tolerances in the tangential direction are compensated by the joints 12 between the segment modules 1.

The individual segment modules 1 are connected directly with one another in the circumferential direction via a force-fit or form-fit connection. The joints 12 between the segment modules 1 are padded with plates for example for this purpose and the neighboring segment modules are then bolted together.

To ensure that the outer segments 2 for a tight casing the joints 12 can be sealed. A rubber sealant or similar with sufficient elasticity can be provided between the outer segments 2. During preassembly of the segment modules 1, for example, O-rings can be inserted in the outer segments 2 at the edges and fixed with adhesive.

On the basis of the assembly concept and the design details described here it is possible to assemble a segmented electric machine (for example a direct-drive wind turbine generator) away from the actual production site (for example immediately at the erection site for the wind turbine) without having to conduct the time-consuming alignment of the stator and rotor segments with respect to one another which would otherwise be needed with segmented electric machines, There is also no need to pad the joints between the segments or segment modules.

What is claimed:

1. A method for assembling an electric machine, comprising:
    pair-wise mounting an inner ring segment on an outer ring segment by at least one fixing element to thereby produce multiple segment modules, each having a predefined air gap between the inner and outer ring segments;
    fixing the inner ring segments of the segment modules on an inner assembly device to form a complete ring;
    fixing the outer segments of the segment modules on an outer assembly device, wherein the segment modules are fixed to the inner and outer assembly devices in such a way that a gap remains between neighboring ones of the segment modules in a circumferential direction;
    removing the fixing elements between the inner and outer segments of the segment modules; and
    inserting a connecting element in the gap to connect the neighboring segments modules with one another.

2. The method of claim 1 for assembling a generator for a wind turbine generator system.

3. The method of claim 1, wherein one member of the group consisting of the inner segments and the outer segments forms a rotor and the other member of the group forms a stator of the electric machine.

4. The method of claim 1, wherein the inner segments or the outer segments are fixed to one another in a circumferential direction.

5. The method of claim 1, further comprising fixing the inner segment or outer segment of each of the segment modules on the inner assembly device or outer assembly device via a flange.

6. The method of claim 5, wherein the inner and outer segments extend each in a circumferential direction across a first angle range, said flange extending across an angle range which is smaller than the first angle range.

7. The method of claim 1, further comprising inserting a sealing element in the gap from outside.

8. An electric machine, comprising:
    a stator; and
    a rotor,
    wherein the rotor and the stator are segmented into inner segments and outer segments, with each one of the inner segments forming with each one of the outer segments as a pair a segment module having a predefined air gap between the inner and outer segments, said inner and outer segments being configured as ring segments;
    an inner assembly device to which the inner segments are fixed to form a ring; and
    an outer assembly device to which the outer segments to form a ring, wherein the inner and outer segments are fixed to the inner and outer assembly devices in such a way that a gap remains between neighboring ones of the inner and outer segments in a circumferential direction; and
    a connecting element is inserted in the gap to connect the neighboring inner and outer segments with one another.

9. The electric machine of claim 8, constructed for use a wind turbine generator system.

10. The electric machine of claim 8, wherein the inner segments or the outer segments are fixed to one another in a circumferential direction.

11. The electric machine of claim 8, further comprising flanges respectively fixing the inner segments to the inner assembly device or the outer segments to the outer assembly device.

* * * * *